(12) United States Patent
Üyünük (10) Patent No.: US 11,642,775 B2
(45) Date of Patent: May 9, 2023

(54) INDIVIDUAL EMERGENCY BRAKE SYSTEM FOR WIND TURBINE BLADE ROTATING DEVICE

(71) Applicant: TPI Composites, Inc., Warren, RI (US)

(72) Inventor: Mehmet Üyünük, Izmir (TR)

(73) Assignee: TPI Composites, Inc., Warren, RI (US)

( * ) Notice: Subject to any disclaimer, the term of this patent is extended or adjusted under 35 U.S.C. 154(b) by 1001 days.

(21) Appl. No.: 16/373,286

(22) Filed: Apr. 2, 2019

(65) Prior Publication Data
US 2019/0299392 A1 Oct. 3, 2019

Related U.S. Application Data

(60) Provisional application No. 62/651,581, filed on Apr. 2, 2018, provisional application No. 62/651,588, filed (Continued)

(51) Int. Cl.
*B25H 1/00* (2006.01)
*F03D 13/40* (2016.01)
(Continued)

(52) U.S. Cl.
CPC ............. *B25H 1/005* (2013.01); *B25B 1/205* (2013.01); *B60P 3/40* (2013.01); *F03D 13/40* (2016.05);
(Continued)

(58) Field of Classification Search
CPC . B25H 1/005; B25B 1/205; B60P 3/40; F03D 13/40; F16M 11/10; F16M 11/18;
(Continued)

(56) References Cited

U.S. PATENT DOCUMENTS 3,402,904 A 9/1968 Paraskewik
3,430,981 A * 3/1969 Tarantola .................. F41A 9/87
410/38
(Continued)

FOREIGN PATENT DOCUMENTS

CN 104421097 A 3/2015
CN 205336053 U 6/2016
(Continued)

OTHER PUBLICATIONS

International Search Report and Written Opinion for International Application No. PCT/US2019/025425 dated Jun. 24, 2019.
(Continued)

*Primary Examiner* — Muhammad Ijaz
(74) *Attorney, Agent, or Firm* — Stephen J. Kenny; Vincenzo DiMonaco; Foley Hoag LLP (57) ABSTRACT

A wind turbine blade rotating and braking apparatus comprising: a root device including: a root support member having an upper surface with a radius of curvature and configured to receive a portion (e.g. root) of a wind turbine blade, rollers having a longitudinal axis parallel to the longitudinal axis of the blade and configured to rotate the blade; braking mount on the sides of the root support member; and a braking mechanism (e.g. strap or band) fixedly attached to the first mount, releasably attached to the second mount and extending above the blade to apply a braking force to the blade. Once applied, the braking force can be maintained by a locking pin.

18 Claims, 5 Drawing Sheets

Related U.S. Application Data on Apr. 2, 2018, provisional application No. 62/651,586, filed on Apr. 2, 2018, provisional application No. 62/651,601, filed on Apr. 2, 2018.

(51) Int. Cl.

| *F16M 11/10* | (2006.01) |
|---|---|
| *F16M 11/18* | (2006.01) |
| *F16M 11/38* | (2006.01) |
| *F16M 11/42* | (2006.01) |
| *B60P 3/40* | (2006.01) |
| *B25B 1/20* | (2006.01) |
| *B62B 5/00* | (2006.01) |

(52) U.S. Cl.
CPC ............. *F16M 11/10* (2013.01); *F16M 11/18* (2013.01); *F16M 11/38* (2013.01); *F16M 11/42* (2013.01); *B62B 5/003* (2013.01); *B62B 5/0033* (2013.01); *F05B 2240/941* (2013.01); *F05B 2260/02* (2013.01); *F05B 2260/30* (2013.01); *F16M 2200/022* (2013.01); *F16M 2200/028* (2013.01)

(58) Field of Classification Search
CPC .. F16M 11/38; F16M 11/42; F16M 2200/022; F16M 2200/028; B62B 5/003; B62B 5/0033; B62B 2203/74; B62B 5/0086; F05B 2240/941; F05B 2260/02; F05B 2260/30; Y02E 10/72
USPC .......................................................... 269/55
See application file for complete search history.

(56) References Cited

U.S. PATENT DOCUMENTS

| 4,243,350 | A | * | 1/1981 | Hall ................. B60P 7/083 242/381.3 |
|---|---|---|---|---|
| 5,251,893 | A | | 10/1993 | Schoenhenz |
| 5,885,040 | A | | 3/1999 | Parker |
| 7,303,365 | B2 | | 12/2007 | Wobben |
| 7,670,090 | B1 | | 3/2010 | Landrum et al. |
| 7,967,536 | B2 | | 6/2011 | Broderick et al. |
| 8,313,272 | B2 | | 11/2012 | Koike |
| 8,632,286 | B2 | | 1/2014 | Wessel et al. |
| 8,708,625 | B1 | | 4/2014 | Landrum et al. |
| 8,753,050 | B2 | | 6/2014 | Cyrus et al. |
| 9,004,843 | B2 | | 4/2015 | Lemos et al. |
| 9,347,426 | B2 | | 5/2016 | Landrum et al. |
| 9,429,139 | B2 | | 8/2016 | Johnson et al. |
| 9,638,162 | B1 | | 5/2017 | Fletcher et al. |
| 9,945,351 | B2 | | 4/2018 | Lulker et al. |
| 10,857,663 | B2 | * | 12/2020 | Üyünük ................. F16M 11/42 |
| 11,027,412 | B2 | * | 6/2021 | Üyünük ................. F16M 11/38 |
| 2005/0115775 | A1 | | 6/2005 | Thomson et al. |
| 2006/0251517 | A1 | | 11/2006 | Grabau |
| 2009/0020445 | A1 | | 1/2009 | Koike |
| 2009/0169323 | A1 | | 7/2009 | Livingston |
| 2011/0008147 | A1 | | 1/2011 | Lemos et al. |
| 2011/0031292 | A1 | | 2/2011 | Krogh et al. |
| 2011/0131785 | A1 | * | 6/2011 | Madsen ................. B60P 3/40 29/700 |
| 2011/0142589 | A1 | | 6/2011 | ten Thoren |
| 2012/0124833 | A1 | | 5/2012 | Arendt et al. |
| 2013/0104376 | A1 | | 5/2013 | Pedersen |
| 2013/0119002 | A1 | | 5/2013 | Frederiksen |
| 2013/0315685 | A1 | | 11/2013 | Pedersen et al. |
| 2014/0103277 | A1 | | 4/2014 | Cormack |
| 2014/0259669 | A1 | | 9/2014 | Busbey et al. |
| 2014/0356113 | A1 | | 12/2014 | Schmidt et al. |
| 2014/0361127 | A1 | | 12/2014 | Van Der Zee |
| 2014/0369779 | A1 | | 12/2014 | Randall |
| 2015/0028610 | A1 | | 1/2015 | Hansen et al. |
| 2015/0144761 | A1 | | 5/2015 | Davi et al. |
| 2015/0329036 | A1 | | 11/2015 | Johnson et al. |
| 2015/0337799 | A1 | | 11/2015 | Hansen et al. |
| 2016/0302545 | A1 | | 10/2016 | Berger |
| 2018/0118538 | A1 | | 5/2018 | Latvys |
| 2018/0223811 | A1 | | 8/2018 | Fletcher et al. |
| 2019/0299393 | A1 | * | 10/2019 | Üyünük ................. B62B 5/0086 |
| 2021/0086345 | A1 | * | 3/2021 | Üyünük ................. F16M 11/18 |
| 2021/0291350 | A1 | * | 9/2021 | Üyünük ................. F16M 11/10 |

FOREIGN PATENT DOCUMENTS

| CN | 108423399 A | 8/2018 |
|---|---|---|
| DE | 10211357 A1 | 9/2002 |
| DE | 202016100449 U1 | 5/2017 |
| EP | 2584191 A1 | 4/2013 |
| EP | 2708731 A2 | 3/2014 |
| EP | 3046803 A1 | 7/2016 |
| JP | 2010/216317 A | 9/2010 |
| JP | 2012/500150 A | 1/2012 |
| KR | 20090132080 A | 12/2009 |
| WO | WO-2012/048718 A1 | 4/2012 |
| WO | WO-2012/048719 A1 | 4/2012 |
| WO | WO-2017/131515 A1 | 8/2017 |
| WO | WO-2019/195322 A1 | 10/2019 |

OTHER PUBLICATIONS

International Search Report and Written Opinion for International Application No. PCT/US2019/025429 dated Jun. 24, 2019.
International Search Report and Written Opinion for International Application No. PCT/US2019/025432 dated Jun. 20, 2019.
International Search Report and Written Opinion for International Application No. PCT/US2019/025442 dated Jun. 18, 2019.
Extended European Search Report for EP Application No. 19781550.9 dated Nov. 29, 2021.
Extended European Search Report for EP Application No. 19781696 dated Jan. 11, 2022.
Suppplementary European Search Report for EP Application No. 19780950 dated Dec. 15, 2021.
Suppplementary European Search Report for EP Application No. 19781091 dated Dec. 15, 2021.

\* cited by examiner

INDIVIDUAL EMERGENCY BRAKE SYSTEM FOR WIND TURBINE BLADE ROTATING DEVICE

CROSS-REFERENCE TO RELATED APPLICATIONS

This application claims the benefit under 35 USC 119 of priority to U.S. Provisional Application Nos. 62/651,586, 62/651,581, 62/651,588 and 62/651,601 filed Apr. 2, 2018, the entire contents of each are hereby incorporated by reference.

BACKGROUND OF THE DISCLOSED SUBJECT MATTER

Field of the Disclosed Subject Matter

The disclosed subject matter relates to a wind turbine rotor blade handling and braking system, and a corresponding method of operating such a system.

Description of Related Art

A variety of methods and systems are known for use in the manufacturing process of wind turbine blades, including carts acting to support a section of the wind turbine blade, e.g. after removal from the blade mold, and during post molding operations (e.g. external blade surface grinding or coating operations).

Conventional blade carts comprise an enclosed ring structure which is fitted around the body of the blade. However, as blade dimensions increase, these carts are often difficult to mount to the blade. Often times a crane is required to support the blade weight while the cart is moved (often manually) along the blade. In addition, the cart presents a hazard during post molding operations where people and equipment are hindered by the large ring, and prevented from easily accessing the blade leading and trailing edges at the location of the cart.

Conventional blade carts are configured with closed brackets forming a closed ring into which the wind turbine blade is introduced. The drawback of this configuration lies in the operation of loading the blade into the cart since to perform the loading step either the cart must be moved from the tip of the blade to the position of the blade where the cart can support the blade weight, or the blade must be moved into the cart by means of using an overhead travelling crane and cables. In addition to the undesirable complexity of such conventional blade handling systems, operation of these conventional systems require a variety of movements which present high risk of blade damage when introducing and removing the various components.

Some exemplary conventional blade handling systems are disclosed in WO 2013092597, WO 2012048719, US 20140356113, EP 2584191, JP2010216317, each of which is hereby incorporated by reference it its entirety, including the particular blade contacting elements and relative range of motions disclosed.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a wind turbine blade apparatus comprising: a root device, the root device including: a root support member, the root support member having an upper surface with a radius of curvature and configured to receive a portion of a wind turbine blade, at least one roller, the roller having a longitudinal axis parallel to the longitudinal axis of the blade and configured to rotate the blade; a braking mechanism, the braking mechanism extending above the blade and releasably secured to at least one side of the root support member and configured to apply a braking force to the blade.

In some embodiments, a first end of the braking mechanism is releasable attached to the root support member with a pin.

In some embodiments, the pin includes an opening, the opening configured to receive the braking mechanism and the pin rotates to wind up the braking mechanism around the pin. Additionally, the braking mechanism includes a gear and chain to rotate the pin.

In some embodiments, the braking force is applied in an rapid manner. Additionally or alternatively, the braking force is applied in a gradual manner.

In some embodiments, at least one roller is configured as a conveyor belt.

In some embodiments, the rotation force and braking force are powered by the same energy source.

In some embodiments, the braking mechanism can be programmed to automatically trigger a braking force when the blade reaches a preset rotation speed.

In accordance with another aspect of the disclosure, a wind turbine blade apparatus comprising: a root device, the root device including: a root support member, the root support member having an upper surface with a radius of curvature and configured to receive a portion of a wind turbine blade, at least one roller, the roller having a longitudinal axis parallel to the longitudinal axis of the blade and configured to rotate the blade; a first mount disposed on a first lateral side of the root support member; a second mount disposed on a second lateral side of the root support member; a braking mechanism, the braking mechanism fixedly attached to the first mount, releasably attached to the second mount and extending above the blade to apply a braking force to the blade; wherein the braking force can be maintained by a locking pin.

In some embodiments, the braking mechanism is a flexible strap.

In some embodiments, the root device includes a propulsion mechanism for rotating the wind turbine blade.

In some embodiments, the upper surface of the root support member has a radius of curvature generally equivalent to the outer surface of the blade.

In some embodiments, the locking pin is rotated in a first direction to reduce the length of the braking mechanism.

In some embodiments, the locking pin is rotated in a second direction to increase the length of the braking mechanism.

In some embodiments, the locking pin is rotated by a chain and gear assembly.

In some embodiments, the locking pin includes an opening configured to receive a portion of the braking mechanism.

In some embodiments, at least one mount is disposed below at least one roller.

In some embodiments, the braking mechanism is disposed proximate a midpoint of a roller.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

DETAILED DESCRIPTION OF AN EXEMPLARY EMBODIMENT

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for handling, e.g. clamping, securing, rotating and transporting a wind turbine blade. The system and apparatus disclosed herein can be used to facilitate various finishing processes of the wind turbine blade manufacturing. In an exemplary embodiment, this system consists of two separate apparatus called "Root Device" and "Tip device" as shown within the figures included herein.

Figure 1:
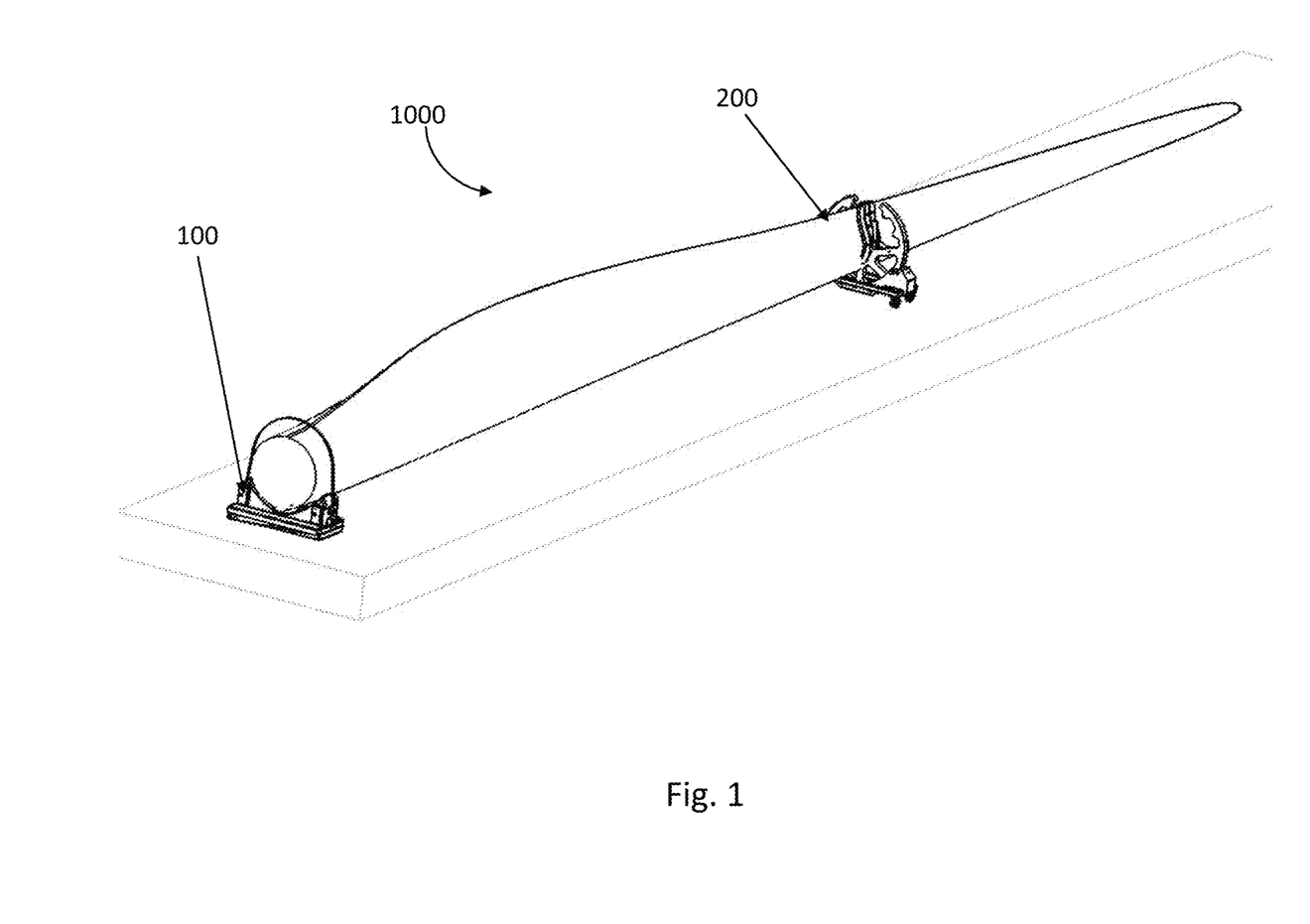
FIG. 1 is a schematic representation of a wind turbine blade mounted to the handling system disclosed herein.

As shown in FIG. 1, the system 1000 generally includes a Root Device (100) and a Tip Device (200). These subsystems 100, 200 provide additional handling functions and the ability to handle larger wind turbine blades with higher efficiency, accessibility and ergonomics than conventional handling systems.

Self-Aligned Tilt & Yaw System—Root Device (100)

The Root Device (100) includes a base (110) and a root support member (120), as shown in FIGS. 1-5. The root support member (120) can be a single, integral unit, or can be comprised of a plurality of discrete units which can be joined together or otherwise connected to receive and support a wind turbine blade.

The Root Device (100) is adapted to receive the root portion of the wind turbine blade, and to rotate the blade (at various speeds). Accordingly, the root support member (120) is configured with a complimentary shape to the wind turbine root, e.g. arcuate. The root support member (120) can comprise a curved shape with a radius which is similar to the outer radius of the root portion. In more general terms, the shape of the root supporting member is adapted to the shape of the root portion. In some embodiments the root support member 120 can be adjustable to accommodate varying root geometries.

The power to generate the movement (e.g. rotation about the blade longitudinal axis) of the wind turbine blade can be provided in a variety of ways, e.g. electric motor, pneumatic or hydraulic systems. In some embodiments, the power means (and associated wiring, cables or piping, as the case may be) are housed directly within the Root Device. In other embodiments, the power source, and/or auxiliary power systems, can be located external to the Root Device (100) housing.

The Root Device also includes rollers (118) for engaging the blade and facilitating rotation of the blade along the blade longitudinal axis. In some embodiments, the rollers (118) can be configured to extend or protrude outwardly from the root support member (120), when in the empty or unloaded configuration (i.e. when no blade is present on the Root Device). These rollers (118) can then be depressed or sunk, independently of each other, once a blade is deposited onto the Root Device, thereby engaging the roller (118). Such independent movement allows the blade to be leveled/balanced within the root device. This relative movement or displacement of the rollers can be a linear trajectory in some embodiments (e.g. vertically up/down). In other embodiments, the rollers (118) may be pivoted relative to the root support member (120). In some embodiments, the rollers 118 are rigidly mounted to the root support member (120) with the only permissible motion being rotation about their central axes. The roller engages, and facilitates rotation, with the root portion of the blade by surface friction. Accordingly, when the power driving means are applied to the rollers (118) each roller begins to rotate, which in turn, causes the blade to rotate. The rollers (118) can be metal structures which are coated with a coating (e.g., PU) on the outer surface to increase the friction force between the blade and the roller.

The dimensions of the rollers are configured to correlate with a dimensions of the blade, e.g. when handling a heavier/long rotor blade a larger/longer roller is used than for handling a light/short rotor blade. However, the length of the rollers may correlate with a specific design, e.g. having an eccentric shape, of the rotor blade and/or maintaining a desired surface pressure between the rollers and the rotor blade. Employing flexible rollers which can adjust in positioning is advantageous in that it allows the system to adapt to blades of different radii and/or shapes.

In some embodiments, the rollers (118) can be configured as conveyor belts with a strap of gripping material wrapped around adjacent rollers. In such embodiments, the surface area in contact with the blade is thus increased compared to the discrete roller configuration. Also, each of the conveyor belts can cling to the blade independently of the other conveyor belts. As a result, in each case a high contact surface is achieved even with components having different diameters, via which each of the conveyor belts rests against the component in a force-locking manner. As a result, the turning device ensures reliable holding of the component even with different component diameters. In some embodiments, the spacing between rollers (118) is adjustable, and the total number of rollers (118) employed can be greater or less the four depicted in the exemplary embodiment shown.

In accordance with an aspect of the disclosure, the Root Device (100) includes a braking system (150) which safely and securely maintains the blade on/within the Root Device (e.g. during transport, and in some embodiments, can control the speed of rotation of the blade. In the exemplary embodiment shown, the braking system (150) includes a strap or band that extends above the root support member (120) and is secured on both sides of the root support member (120).

The band can be made of a variety of materials, e.g. fabric, metal, rubber, plastic and is configured with dimensions suitable to accommodate blades of varying sizes and shapes. Additionally, the band can be coated with a material (e.g. polyurethane), and/or include a protective layer to prevent damage to the turbine blade. This coating/layer can increase, or decrease if so desired, the friction generated between the band and turbine blade.

Figure 3:
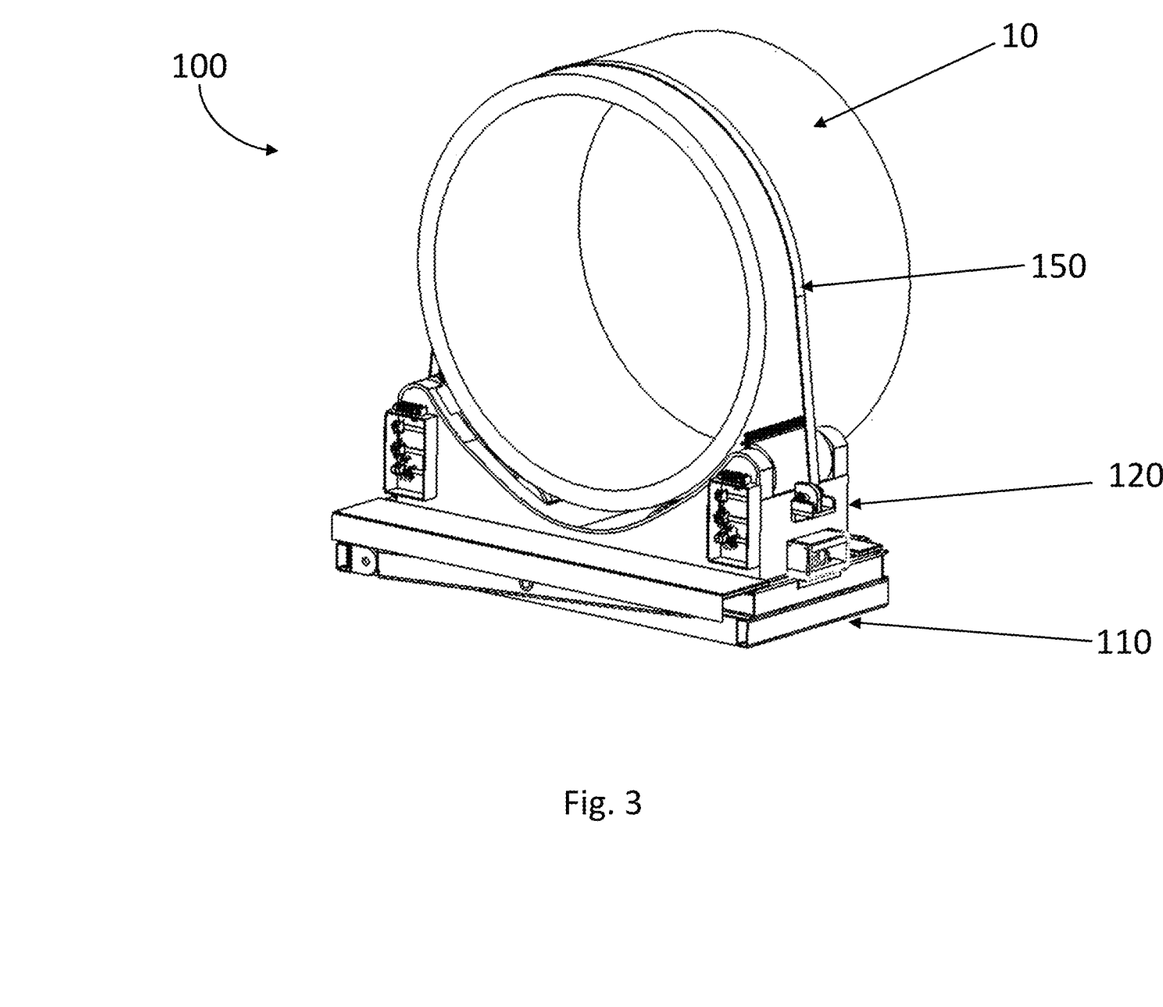
FIG. 3 is a schematic representation of the root device and brake of the handling system disclosed herein, including a portion of a wind turbine blade root.
Figure 4:
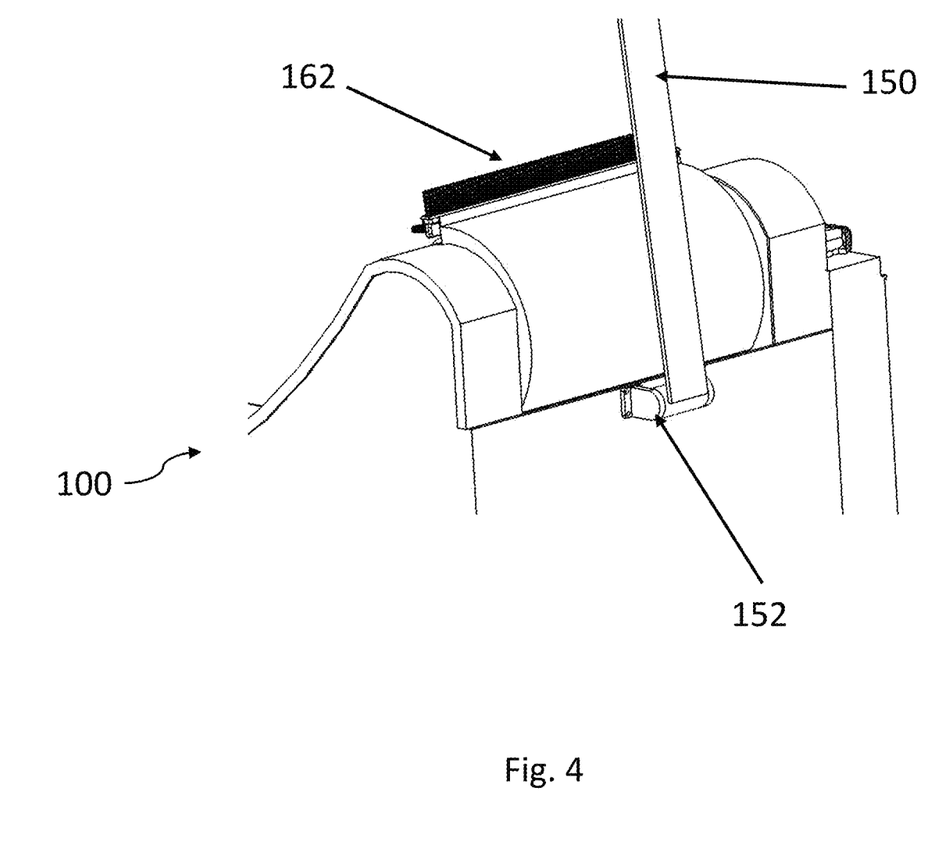
FIGS. 4-5 are zoom-in views of schematic representations of the root device and brake of the handling system disclosed herein.
Figure 5:
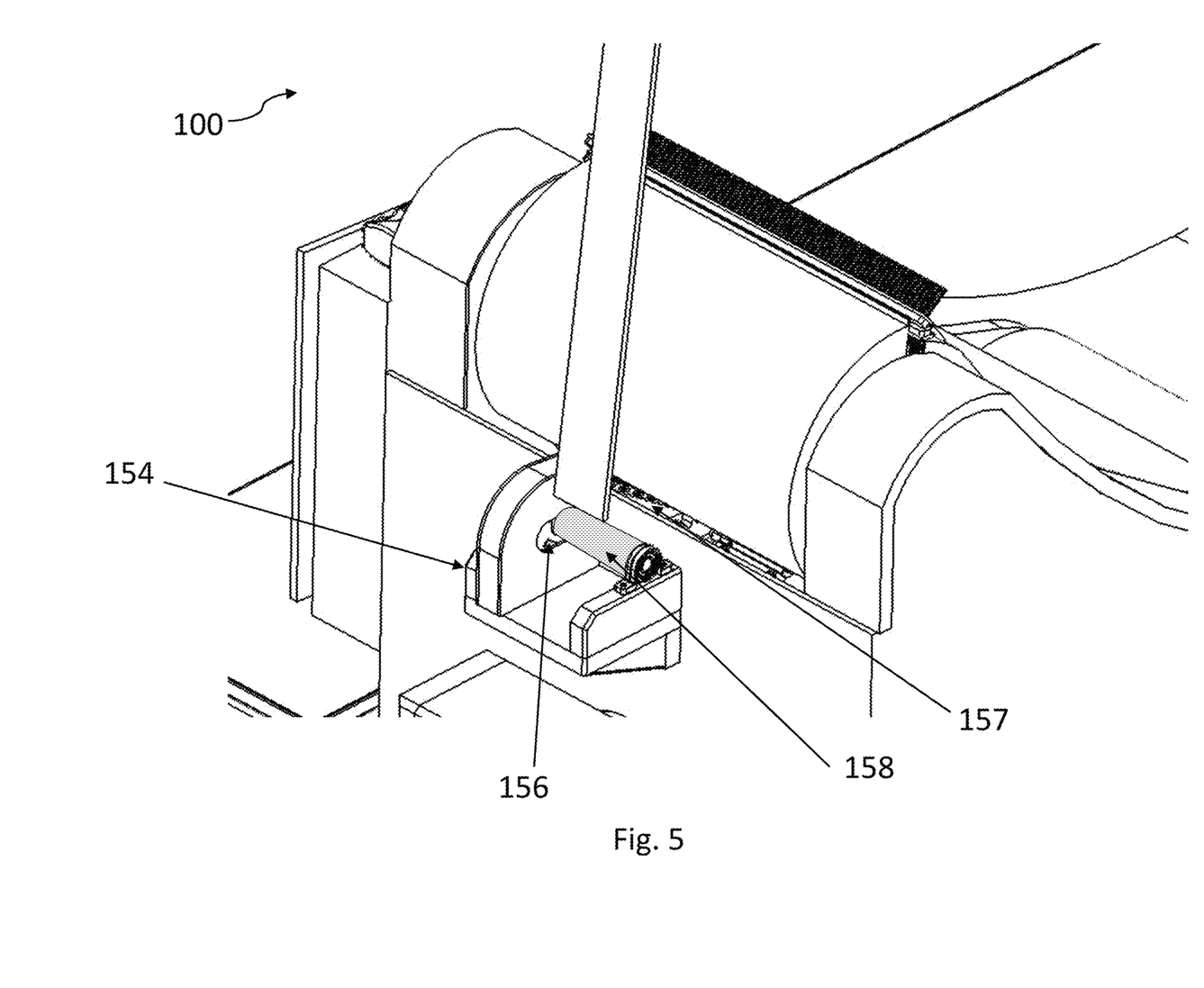

In the exemplary embodiment shown in FIG. 4, the band 150 is permanently attached to the root support member (120) via mount (152). The mount can extend laterally outward, e.g. beyond the periphery of the rollers (118), as shown in FIG. 4. The other end of the band can be releasably attached to an adjustable locking device. In the embodiment shown in FIG. 5, the locking device can include a motor and gear (156) which can be driven by chain (157) to tighten (or loosen) the band (152) over a wind turbine blade (a representative root section 10 of a blade is depicted in FIG. 3). The gear (156) can be contained within a housing positioned on the mount (154) to prevent debris from interfering with the operation. The motor can be operated and controlled by programmable software to a defined amount of torque and tension within the band (152), which is a function of the wind turbine blade parameters, e.g. weight, diameter, length, materials, etc. Also, the braking system can be powered by the same energy source as the rollers (118).

The band (152) can be releasably attached to a connection pin (158) of the locking device. For example, the connection pin (158) can have a slot or channel formed within its cylindrical stem for receiving the band (152). In some embodiments, the motor can operate to rotate the connection pin (158) to wind up the band (150) in a winch-like manner to remove any slack and reach the desired amount of tension within the band (150) to in turn generate the braking force on the turbine blade. Upon release from pin (158) the band (152) can be automatically retracted by a recoil mechanism on the mount (152) and stored therein. Similarly, the mount (152) can include a dispensing slot through which the band (150) can be dispensed and retrieved. This serves to reduce the risk of injury by removing any trip hazard that the band (150) may present. Although the exemplary embodiment depicts the two mounts (152, 154) as aligned about an axis perpendicular to the blade span, in some embodiments the mounts 152, 154 may be offset so as to wrap the band (150) around the blade at an angle with respect to the blade span.

Figure 2:
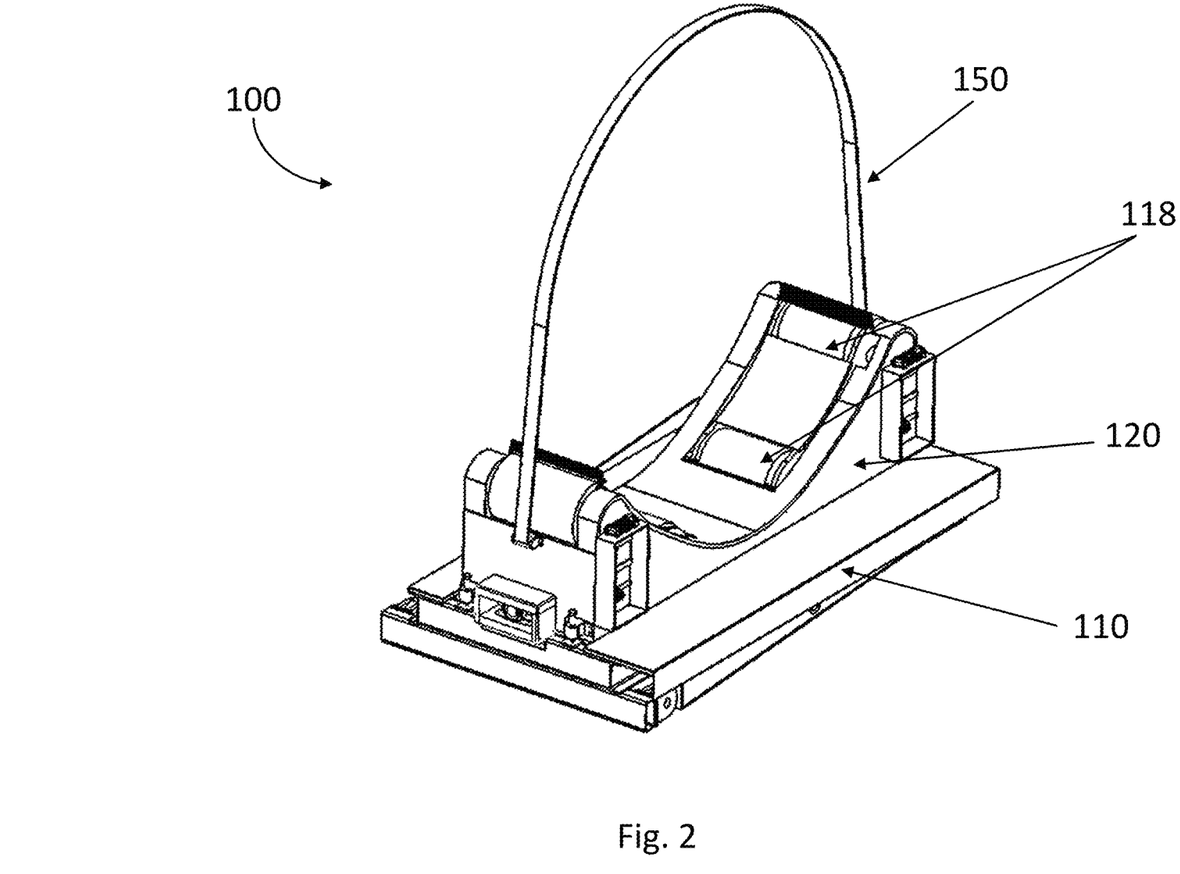
FIG. 2 is a schematic representation of the root device of the handling system disclosed herein.

In accordance with an aspect of the disclosure, the band (150) can securely straddle a wind turbine blade positioned within the root support member (120) and permit rotation of the wind turbine blade, without impeding the speed of rotation or generating any significant friction between the band (152) and turbine blade surface. During operation, the band can be released from a first end (154) to open the Root Device for receipt of a wind turbine blade. Once the wind turbine blade is placed within the root support member (120), the band can be positioned over the blade and the first end (154) is reattached to the root support member (120), as shown in FIG. 3. The band can be a flexible so as to adapt and conform to any desired contour, or formed of a sufficiently rigid material so as to maintain its arcuate shape even when no blade is present within the Root Device (100), as shown in FIG. 2. Additionally, although only a single band (150) is shown in the exemplary embodiments, a plurality of bands can be employed, distributed along the span of the blade, as necessary to achieve the desired amount of braking force.

Additionally, sensors can be employed at various locations to measure the rotational speed, and any accelerations or vibrations, of the wind turbine blade within the Root Device (100). For example, wheeled encoders can be located on the frame between rollers (118) and engage the blade to measure the rotational speed and acceleration of the blade. The sensors can also measure the forces applied to the band (152). Additionally, brushes (162) can be provided to ensure the system is free of debris. A first brush can be oriented towards the roller and a second brush oriented towards the blade surface. The braking system disclosed herein can be programmed to automatically trigger a braking force within the band (152) to inhibit or prevent rotation of the blade. Additionally, the braking system disclosed herein can be manually operated to trigger the braking force. The braking force can be applied in a gradual manner to steadily decrease the rotational speed of the turbine blade. Additionally or alternatively, the braking force can be applied in an abrupt manner, e.g. emergency brake, to seize the rotor blade and prevent any further rotation. The braking force can be applied and maintained by locking the connecting pin (158) in place. This can be done by the teeth on gear (157) which prevent reverse rotation when in the locked position.

An exemplary operational speed of blade rotation in this system is one cycle (360 degree rotation of the blade) within 3-4 minutes. Accordingly, the emergency system disclosed herein is able to detect velocity deviation within a few seconds and does not increase the momentum of the blade. Emergency conditions (e.g. blade fall) can happen when the blade self-weight momentum is greater than friction force between blade and rollers. In such scenarios, the emergency brake system can: i) add additional friction surface (e.g. generated via engagement with the strap 150 surface); and/or ii) increase vertical force exerted on the blade to increase the friction force at rollers. This additional force will be absorbed by fixed point of straps (152) which are bonded with structural main frame (e.g. free of any dampening springs).

Accordingly, the braking system (150) of the present disclosure can be configured as separate system from the propulsion system which rotates the turbine blade (via rollers 118). These two systems can operate independently of each other, either in a simultaneous fashion, or in serial with one system terminating prior to initiation of the other system.

Also, the braking system disclosed herein enhances the safety of personnel within the proximity of the blade. Furthermore, the present disclosure reduces the risk of damage to the wind turbine blade as excessive speeds and/or instability is reduced via the greater control provided by the braking system.

The Root Device (100) operates in concert with the Tip Device, described in further detail below. Thus, in accordance with an aspect of the present disclosure, during operation, the blade rotational force is generated within the Root Device (100) and the braking force is likewise generated (independently, simultaneously, or in series from the rotational force) in the Root Device (100).

Self-Aligned Tilt & Yaw System—Tip Device (200)

In accordance with another aspect of the present disclosure, the Root Device (100 and Tip Device (200) can be arranged as separate and independently operable components. In some embodiments, blade rotation is driving by Root device (100), with the tip device (200) having no drive unit for rotation and it is self-synchronizing meanwhile rotation by the blade itself. In some embodiments the Root Device and Tip Device can include position indicating mechanisms which convey the relative position of one component with respect to another. For example, an optical, e.g. laser, mechanism can be included which alerts the user when the Root Device and Tip Device are properly aligned (e.g. with respect to the blade longitudinal axis). If the Tip Device were accidentally displaced, an alarm can notify the user to take corrective action to bring the Tip Device back into alignment so as to not induce any undesired loads on the blade, or support apparatus. Preferably, the system disclosed herein is synchronized with the Root Device and Tip Device coordinated to move, e.g. rotate, at the same time and at the same speeds.

Moreover, the Root Device and Tip Device can be configured to restrict relative movement therebetween, such that each apparatus moves in concert with the other (e.g. relocated along a shop floor) without imparting any loads on the blade disposed therein.

It will be understood that once the blade is supported within the Root Device and Tip Device any external support means, e.g. a harness, a crane, etc., for the blade can be removed. In some embodiments, the portions of the apparatus which engage the blade can include a protective cover to prevent damage and further absorb or cushion against undesired load transfer. Embodiments of the wind turbine blade handling system as described above may be flexible and can adapt to various rotor blade positions. This can result in smaller loads on the rotor blade. As a consequence, the risk of damages to the rotor blade is reduced.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A wind turbine blade apparatus for handling a wind turbine blade, the apparatus comprising:
    a root device, the root device including:
        a root support member, the root support member having an upper surface with
            a radius of curvature and configured to receive a portion of the blade,
        at least one roller, the at least one roller having a longitudinal axis extending along a rotational axis of the roller and configured to be parallel to the longitudinal axis of the blade and configured to rotate the blade;
        a braking mechanism, the braking mechanism configured to extend above the blade and releasably secured to at least one side of the root support member and configured to apply a braking force to the blade.

2. The wind turbine blade apparatus of claim 1, wherein a first end of the braking mechanism is releasable attached to the root support member with a pin.

3. The wind turbine blade apparatus of claim 1, wherein a pin includes an opening, the opening configured to receive the braking mechanism.

4. The wind turbine blade apparatus of claim 1, wherein a pin rotates to wind up the braking mechanism around the pin.

5. The wind turbine blade apparatus of claim 2, wherein the braking mechanism includes a gear and chain to rotate the pin.

6. The wind turbine blade apparatus of claim 1, wherein the braking force is applied automatically.

7. The wind turbine blade apparatus of claim 1, wherein a rotation force and the braking force are powered by a common energy source.

8. The wind turbine blade apparatus of claim 1, wherein the braking mechanism can be programmed to automatically trigger the braking force when the blade reaches a preset rotation speed.

9. A wind turbine blade apparatus for handling a wind turbine blade, the apparatus comprising:
    a root device, the root device including:
        a root support member, the root support member having an upper surface with
            a radius of curvature and configured to receive a portion of the blade,
        at least one roller, the at least one roller having a longitudinal axis extending along a rotational axis of the roller and configured to be parallel to the longitudinal axis of the blade and configured to rotate the blade;
        a first mount disposed on a first lateral side of the root support member;
        a second mount disposed on a second lateral side of the root support member;
        a braking mechanism, the braking mechanism fixedly attached to the first mount, releasably attached to the second mount and configured to extend above the blade to apply a braking force to the blade;
    wherein the braking force can be maintained by a locking pin.

10. The wind turbine blade apparatus of claim 9, wherein the braking mechanism is a strap.

11. The wind turbine blade apparatus of claim 9, wherein the root device includes a propulsion mechanism for rotating the wind turbine blade.

12. The wind turbine blade apparatus of claim 9, wherein the radius of curvature of the upper surface of the root support member is generally equivalent to an outer surface of the blade.

13. The wind turbine blade apparatus of claim 9, wherein the locking pin is rotated in a first direction to reduce a length of the braking mechanism.

14. The wind turbine blade apparatus of claim 9, wherein the locking pin is rotated in a second direction to increase a length of the braking mechanism.

15. The wind turbine blade apparatus of claim 9, wherein the locking pin is rotated by a chain and gear assembly.

16. The wind turbine blade apparatus of claim 9, wherein the locking pin includes an opening configured to receive a portion of the braking mechanism.

17. The wind turbine blade apparatus of claim 9, wherein at least one mount is disposed below the at least one roller.

18. The wind turbine blade apparatus of claim 9, wherein the braking mechanism is disposed proximate a midpoint of the at least one roller.

\* \* \* \* \*